(No Model.)
C. P. STATON.
KITCHEN CABINET AND SIFTER THEREFOR.
No. 497,461. Patented May 16, 1893.
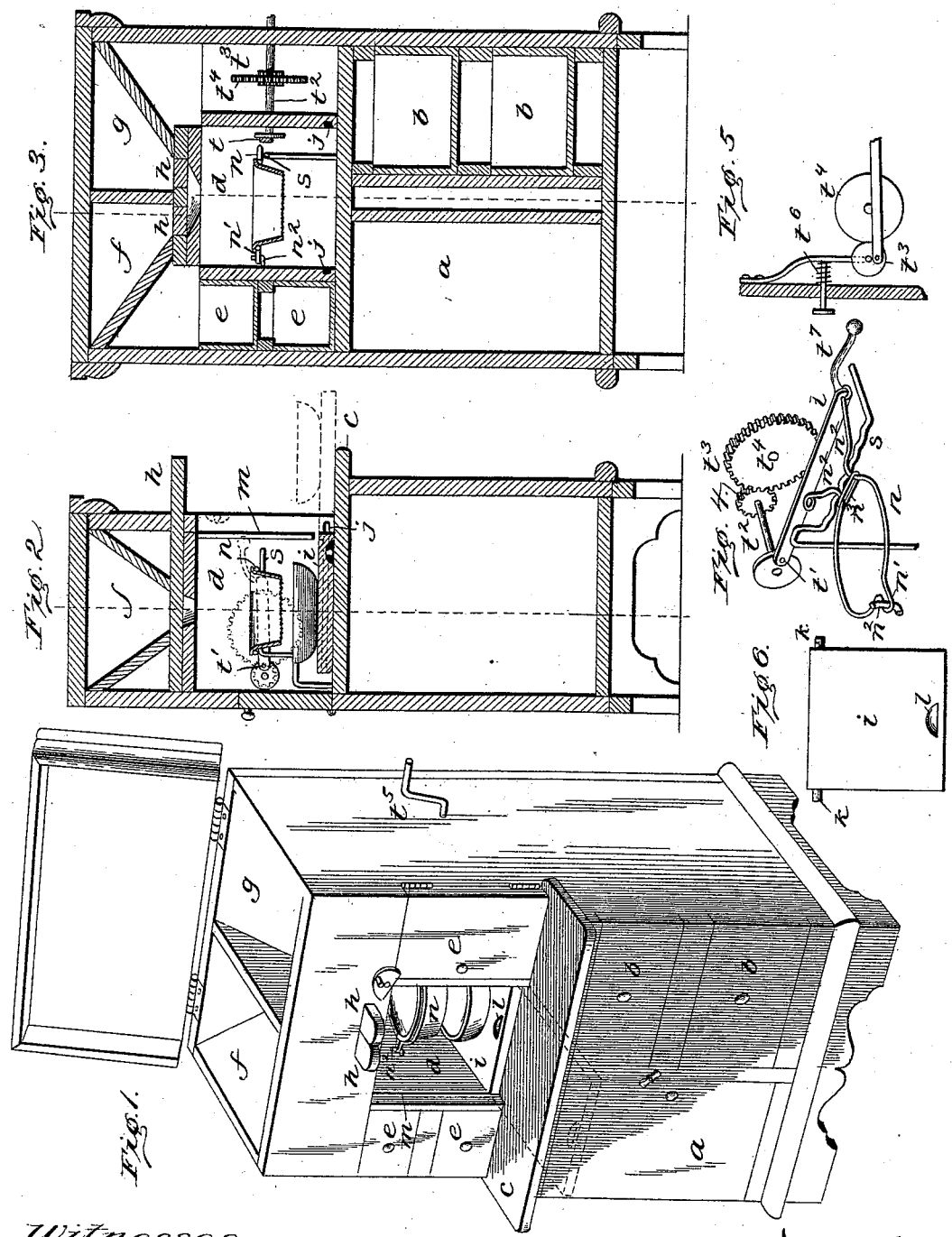
Witnesses
Edwin L. Bradford
Inventor
Charles Pinkney Staton
By Johnson & Johnson
his Attorneys.

UNITED STATES PATENT OFFICE.

CHARLES PINKNEY STATON, OF HACKETT CITY, ARKANSAS, ASSIGNOR OF ONE-HALF TO EDMOND WINDFIELD HARPER, OF SAME PLACE.

KITCHEN-CABINET AND SIFTER THEREFOR.

SPECIFICATION forming part of Letters Patent No. 497,461, dated May 16, 1893.

Application filed December 27, 1892. Serial No. 456,350. (No model.)

*To all whom it may concern:*

Be it known that I, CHARLES PINKNEY STATON, a citizen of the United States, and a resident of Hackett City, in the county of Sebastian and State of Arkansas, have invented certain new and useful Improvements in Kitchen-Cabinets and Sifters Therefor, of which the following is a specification.

My improved kitchen cabinet is designed to afford every convenience to persons having in charge the cooking and pastry of a household. It has in compact construction and relation, flour chests, drawers, and compartments for containing the food and materials and the articles and vessels to work with. It has an oscillating sieve and a sliding kneading-board, which serves to carry a tray into a compartment under the sieve, to draw it out, and to form a door for closing said compartment.

The accompanying drawings illustrate my improved cabinet for pastry cooking, and the particular improvements I have made will be specifically stated in the claims concluding this specification.

Referring to the drawings: Figure 1 shows a view in perspective of my pastry cabinet, the kneading-board being shown as having carried the tray beneath the sieve. Fig. 2 is a vertical section of the same showing the kneading-board and the tray in position beneath the sieve, and in dotted lines, as having been drawn out from the sifting compartment with the tray. Fig. 3 is a vertical section taken at right angles to Fig. 2. Fig. 4 shows the tray supporting and oscillating device. Fig. 5 is a modification of the same; and Fig. 6 shows the sliding door and kneading-board.

The cabinet structure forms a closure having a compartment $a$ and drawers $b$ beneath a front projecting table part $c$, above and in the rear of which, is a central compartment $d$ for containing a sifter mounted and operated in the way I shall presently state. On each side of this sifting compartment are drawers and shelves $e$, while above it are bins $f$ and $g$ for flour and meal. The outlets for these bins are central with the sifting compartment and are opened and closed by slides $h$, $h$, the handles of which project at the front. This arrangement of the several parts makes it convenient for the keeping of the materials and articles for their use.

I use the front door as the means for carrying the tray into and out of the sifting compartment and for holding it in proper position beneath the sifter; and I use this sliding board $i$ as the kneading-board, when drawn out. For this purpose I make this front door of a size to be slid into the bottom of the sifting compartment between its walls. These walls are provided with co-incident horizontal grooves $j$ and the board $i$ has at its inner corners pins $k$ adapted to fit and to slide in said grooves, to form stops to limit the inward movement of said board, to form stops to limit the outward movement of said board, and to form hinges whereby the board can be turned as a door to close the sifting compartment. For this purpose the wall grooves are closed at their ends and are of the proper length. The sliding board has a finger recess $l$ by which to pull out the board, as seen in Fig. 1, and the inner walls above their grooves are provided with vertical beads $m$ against which the door closes, as seen in Fig. 2.

The sifter is mounted in the compartment above the sliding board so that the latter with and without the tray, can be moved in under the sifter as may be desired. I use a simple ring yoke $n$ as the carrier for the sifter and hang it by an eye $n'$ on a hook $n^2$ on one of the side walls of the compartment, and support the yoke at its opposite side on a horizontal rod $s$ fixed to and projecting from the opposite compartment wall. One end of this yoke which rests on the rod connects with a rod $t$, the other end of which connects with a crank pin $t'$ on a short shaft $t^2$ mounted horizontally in the walls of the sifting compartment and the outer wall of the cabinet. The other end of this shaft $t^2$ has a pinion $t^3$ which engages with a larger gear $t^4$ mounted in the cabinet wall and which has the operating crank $t^5$, outside of the cabinet, whereby an oscillating movement is imparted to the sieve horizontally. I prefer to give the sieve a compound movement and for this purpose I make the fixed rod $s$ on which the sieve slides of serpentine form as seen in Fig. 4, so that simultaneously with the sliding movements of the sieve, it will be caused to have a slight vertical movement at the side on which it is connected with its crank operating rod. This gives a more effective sifting action. I prefer to make the sifter carrier of a single piece of wire bent to form a ring which terminates in arms $n^2$, which rest and slide upon the serpentine rod $s$ and are connected by a loop $n^3$ so as to form a sort of clasp for the sieve which sets within the ring and can be removed to clean it of siftings.

Instead of the gear I may operate the sieve by friction wheels, in which the crank connecting wheel $t^3$ is maintained in contact with the crank handle wheel $t^4$ by a spring $t^6$, as seen in Fig. 5. This construction and arrangement place the sieve over the kneading board and its operating mechanism within the closure of the cabinet.

It is advantageous to adapt the kneading-board to slide in and out beneath the sieve, as it is often desired to sift flour upon the dough being kneaded and upon the board itself in preparing it to receive the dough for the rolling pin, and in such cases the sieve can be shaken by hand, by taking hold of the front end of the rod $t$ as shown at $t^7$ in Fig. 4. In fact I may dispense with the gearing for the operation of the sieve and use the handle $t^7$ as the handle of the sieve supporting yoke and thereby shake the sieve by said handle from the front instead of at the side by the crank handle. In either case the sieve will have the compound movement.

I claim as my improvement—

1. The combination, with a kitchen cabinet having bins, a central compartment and a sieve supported on the vertical walls of the latter beneath the bins, of a kneading board adapted to slide within said compartment beneath the sieve and to fold up to inclose said sieve and compartment, and suitable means for shaking said sieve as described.

2. In a kitchen cabinet of the character stated, the combination of the bins each having a slide controlled bottom opening, a kneading board adapted to slide within a compartment beneath said bins and to fold up to close said compartment, a sieve carrying yoke pivoted on one of the walls of said compartment and resting on a way on the opposite wall and terminating in a handle for shaking it, substantially as described.

3. The combination, with a kitchen cabinet having a central compartment and bins having controlled communication therewith, a sieve carrier pivoted on one of the compartment walls supported on a serpentine way on the opposite wall, and a sifter resting in said yoke, the said yoke terminating in a handle at its freely supported side, substantially as described.

4. The combination with a kitchen cabinet having bins, a central compartment having horizontal grooves in its opposite walls, and a sieve supported on the vertical walls of the latter beneath the bins, of a kneading board adapted to engage and slide within said wall grooves beneath the sieve and to fold up to close said compartment, and a front table part at the bottom of said compartment, the said wall groove connections serving as stops to limit the withdrawal of the kneading board and permit it to be folded to inclose the sieve and compartment, as described.

5. The kitchen cabinet herein described consisting of a suitable closure having separate bins at its top, and slides controlling said bins, a central compartment, a sieve holder mounted therein having a shaking handle within said compartment, a kneading-board adapted to slide within said compartment beneath said sieve, and to form the door for said compartment, and a front table part at the bottom of said compartment substantially as described.

In testimony whereof I have hereunto signed this specification in the presence of witnesses.

CHARLES PINKNEY $\times$ STATON.
his mark

Witnesses:
J. M. NEAL,
JOHN THOMAS.